Patented Sept. 28, 1937

2,094,253

UNITED STATES PATENT OFFICE 2,094,253

ARYL MERCURY AROMATIC POLYBASIC CARBOXYLATES

Carl N. Andersen, Wellesley Hills, Mass., assignor to Lever Brothers Company, a corporation of Maine No Drawing. Application March 11, 1936, Serial No. 68,214

12 Claims. (Cl. 260—13)

The present invention relates to aromatic mercury salts of nitro substituted aromatic polybasic acids.

It is an object of my invention to produce new organic mercury compounds useful as germicides and for other therapeutic purposes.

I have discovered that when the hydrogen atom of an acidic group or groups of nitro substituted aromatic polybasic acids is replaced by the essential radical of certain aromatic mercury compounds, compounds are produced which have extraordinarily high potency as antiseptics and germicides, and at the same time are characterized by relatively low toxicity and other desirable properties.

The compound I have produced may be described as having the general formula $(RHg)_x.R_1$, in which R represents an aromatic structure to a carbon atom of which the mercury is directly attached; in which $R_1$ represents a nitro substituted aromatic polybasic acid radical that is linked to the RHg group, or groups, through the replacement of the hydrogen atom of the acidic group or groups; and in which $x$ represents the number of RHg groups attached to the acid radical. While the word "group" is sometimes used hereinafter, it is obvious that this must be interpreted as plural when more than one aromatic mercury radical is present in the compound.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as, for example, mono or polycyclic hydrocarbons in which all of the nuclear carbon atoms, other than the one attached to mercury, and any side chain carbon atoms, have their valences satisfied either by carbon or hydrogen. Examples are the diphenyl, tolyl, xylyl and naphthyl groups.

The radical $R_1$ represents a radical corresponding to an aromatic compound which contains more than one acidic group, and in which one or more of the hydrogens attached to nuclear carbon atoms have been substituted by a nitro group. The aromatic compound may be mono or polynuclear and one or more of the hydrogens of the acidic groups may be replaced by the RHg group. If the compound is polynuclear the acid groups may be attached to the same or different aromatic rings. The compound may have any acid radical such as the carboxyl, sulfonic, etc. Saturated or unsaturated side chains may be attached to the aromatic nucleus. More than one nitro group may be substituted in a compound, and more than one of the hydrogens of the ring may be replaced by one or more nitro groups and some other atom or group, for example, any monovalent radical.

The following compounds illustrate the above types of acids and acid derivatives falling within the above defined class and from which the aromatic mercury salts of the type heretofore defined may be prepared: 3-nitro phthalic anhydride; 3-nitro naphthalic anhydride; dinitro naphthalic acid; and dinitro benzene tetracarboxylic acid.

In the case of the anhydride and other acid derivatives, the reaction is slightly different, as will be pointed out in more detail hereinafter.

The compounds I have prepared, together with others I have investigated, comprise a sufficiently representative number of the nitro substituted aromatic polybasic acids to lead me to believe that all of the acids of this general group may be employed to produce my novel mercury compounds. The compounds so prepared have in greater or lesser degree, but always in a relatively high degree, antiseptic and germicidal properties. I, therefore, regard my invention generic to and including the entire group of nitro substituted aromatic polybasic acids of the above defined type.

The general method of producing these compounds consists in reacting together a nitro substituted aromatic polybasic acid and a compound containing an aromatic mercury radical of the above defined type. A common solvent for both reacting components is employed. The compound resulting from the reaction is usually relatively insoluble as compared with the reacting components, and upon its precipitation may be filtered, washed and dried. In my application Serial No. 694,198, filed October 18, 1933, I have disclosed a general method of preparing aromatic mercury compounds of this type by reacting the acidic compound with an aromatic mercury hydroxide. This reaction is one of neutralization of an acid and a base to form a salt and water. This has the advantage that water is the only other product produced and the resulting compound may be easily purified.

In my application Serial No. 694,199, filed October 18, 1933, I have disclosed another general method of preparing aromatic mercury compounds of this type by employing a soluble aromatic mercury salt, for example, the acetate or the lactate, in a reaction with the acidic compound. The aromatic mercury compounds produced are of a relatively low solubility as compared with the aromatic mercury salts and are relatively insoluble as compared with the acidic compound. In my application Serial No. 50,001, filed November 15, 1935, I have disclosed a method of preparing aromatic mercury compounds by reacting an acid derivative, such as an ester or anhydride with an aromatic mercury hydroxide to form the corresponding aromatic mercury salt. Any of these general methods may be employed in producing compounds comprising this invention. In these methods the substituted nitro group, or groups, do not enter into the reaction, and the structure of the compound remains the same except for the replacement of the acidic hydrogen, or hydrogens, by the aromatic mercury group or groups.

The following examples are given as illustrative of a method by which all of the compounds comprising this invention may be prepared and as illustrative of representative organic mercury derivatives falling within the scope of my invention.

Example I 7.86 grams of 3-nitro phthalic anhydride is dissolved in 100 cc. of alcohol, and to this solution is added a filtered solution comprising 35.28 grams of phenylmercury hydroxide dissolved in 1 liter of water. The mixture is heated, during which time the anhydride is converted into the acid which reacts with the hydroxide and a heavy precipitate is formed. The mixture is allowed to cool after which it is filtered, and the precipitate is washed. After recrystallization of the material from alcohol it is found to have a melting point of 197–198° C. and is the compound diphenylmercury 3-nitro phthalate.

Example II 7.29 grams of 3-nitro naphthalic anhydride is added to 2 liters of alcohol and the mixture heated until solution is complete. To this is added 17.64 grams of phenylmercury hydroxide dissolved in 500 cc. of water. The mixture is boiled, during which time the anhydride is converted into the acid which reacts with the hydroxide to form the salt. The mixture is concentrated and filtered while hot. The filtrate upon cooling yields yellow crystals which are separated by filtration, washed and dried. Upon recrystallization from alcohol the material is found to have a melting point of 184.5° C. and is the compound diphenylmercury 3-nitro naphthalate.

Example III 17.64 grams of phenylmercury hydroxide is dissolved in 500 cc. of water and heated until solution is complete. The solution is filtered to remove any insoluble material. To the filtrate is added 8.64 grams of dinitro naphthalic acid dissolved in 200 cc. of alcohol. The mixture is heated for a short time and a heavy precipitate is formed which is separated by filtration, washed and recrystallized from alcohol. Upon heating the material it begins to decompose indistinctly at about 215° C. and is the compound diphenylmercury dinitro naphthalate.

The reacting materials are employed in substantially theoretical quantities. In some cases, if desired, approximately 10% excess of the acid or acid derivative may be employed in order to insure a complete conversion of the aromatic mercury compound.

Any suitable solvent in which the reacting components are soluble may be used as the medium for carrying out the reaction. If they are both soluble in water this is generally used for reasons of convenience, but if not, other solvents such as the alcohols or acetone or mixtures of these with each other or with water, may be employed.

The process may be carried out at any temperature, for example, room temperature. In most cases I find, however, that the use of heat facilitates the solution of the reaction components and speeds the reaction.

From the description of the specific examples, it will be readily apparent to one skilled in the art how other members of the above identified group may be reacted with an aromatic mercury compound to produce the other mercury compounds of analogous structure which are within the scope of my invention.

The compounds produced as above described are characterized by extraordinarily high potency as antiseptics and germicides. Tests to determine the efficacy of a representative example in killing E. typhi and Staph. aureus were carried out under the following conditions:

Aqueous solutions of varying dilutions from 1:10,000 upward until killing ceased, were made up.

The dilutions were employed in the conduct of the tests by the following methods:

Circular 198, U. S. Department of Agriculture, Dec. 1931, described as F. D. A. method against *Eberthella typhi* (typhoid bacillus) at 37° C. and F. D. A. special method against *Staph. aureus* at 37° C.

As illustrative of the potency of the compounds, the killing power of the following compounds is given merely for illustration.

The figures represent the maximum dilutions at which killing in 15 minutes resulted:

|  | E. typhi | Staph. aureus |
|---|---|---|
| Phenylmercury 3-nitro phthalate | 1:100,000 | 1:20,000 |

In addition to their high germicidal value, all of these compounds are characterized by relatively low toxicity. Because of these properties it is possible to use them in extreme dilutions and in many situations where known germicides, because of toxic or other undesirable properties, cannot be employed. They may be used externally and locally on human beings and higher animals and in some cases administered internally with satisfactory results from the germicidal standpoint and without harmful effect to the body or its functions.

The compounds retain their germicidal activity when incorporated in soap and various menstruums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. An organic mercury compound having the general formula $(RHg)_x.R_1$ in which R represents an aromatic structure to a carbon atom of which the mercury is directly attached and in which none of the carbon atoms has direct linkage with any element other than hydrogen, carbon and mercury; in which $R_1$ represents a nitro substituted mononuclear polybasic aromatic carboxylic acid radical which is linked to the RHg group through the replacement of acidic hydrogen; and in which $x$ is an integer representing the number of RHg groups attached to the acid radical, which integer is at least one and not more than the number of acidic groups in the radical $R_1$.

2. An organic mercury compound having the general formula $(RHg)_x.R_1$ in which R represents an aromatic structure to a carbon atom of which the mercury is directly attached and in which none of the carbon atoms has direct linkage with any element other than hydrogen, carbon and mercury, and in which $R_1$ represents a nitro substituted polybasic aromatic carboxylic acid radical which is linked to the RHg group through the replacement of acidic hydrogen, and in which $x$ is an integer representing the number of RHg groups attached to the acid radical, which integer is at least one and not more than the number of acidic groups in the radical $R_1$.

3. An organic mercury compound having the general formula $(RHg)_x.R_1$ in which R represents an aromatic structure to a carbon atom of which the mercury is directly attached and in which none of the carbon atoms has direct linkage with any element other than hydrogen, carbon and mercury; in which $R_1$ represents a nitro substituted polynuclear polybasic aromatic carboxylic acid radical which is linked to the RHg group through the replacement of acidic hydrogen; and in which $x$ is an integer representing the number of RHg groups attached to the acid radical, which integer is at least one and not more than the number of acidic groups in the radical $R_1$.

4. An organic mercury compound having the general formula $(RHg)_2.R_1$, in which R represents an aromatic structure to a carbon atom of which the mercury is directly attached and in which none of the carbon atoms has direct linkage with any element other than hydrogen, carbon and mercury; and in which $R_1$ represents a nitro substituted mononuclear dibasic aromatic carboxylic acid radical, which is linked to the RHg groups through the replacement of the acidic hydrogen atoms.

5. An organic mercury compound having the general formula $(RHg)_2.R_1$, in which R represents an aromatic structure to a carbon atom of which the mercury is directly attached and in which none of the carbon atoms has direct linkage with any element other than hydrogen, carbon and mercury; and in which $R_1$ represents a nitro substituted polynuclear dibasic aromatic carboxylic acid radical which is linked to the RHg groups through the replacement of the acidic hydrogen atoms.

6. An organic mercury compound having the general formula $(C_6H_5Hg)_x.R_1$, in which $R_1$ represents a nitro substituted mononuclear polybasic aromatic carboxylic acid radical which is linked to the $C_6H_5Hg$ group through the replacement of acidic hydrogen; and in which $x$ is an integer representing the number of $C_6H_5Hg$ groups attached to the acid radical, which integer is at least one and not more than the number of acidic groups in the radical $R_1$.

7. An organic mercury compound having the general formula $(C_6H_5Hg)_x.R_1$, in which $R_1$ represents a nitro substituted polybasic aromatic carboxylic acid radical which is linked to the $C_6H_5Hg$ group through the replacement of acidic hydrogen, and in which $x$ is an integer representing the number of $C_6H_5Hg$ groups attached to the acid radical, which integer is at least one and not more than the number of acidic groups in the radical $R_1$.

8. An organic mercury compound having the general formula $(C_6H_5Hg)_x.R_1$, in which $R_1$ represents a nitro substituted polynuclear polybasic aromatic carboxylic acid radical which is linked to the $C_6H_5Hg$ group through the replacement of acidic hydrogen; and in which $x$ is an integer representing the number of $C_6H_5Hg$ groups attached to the acid radical, which integer is at least one and not more than the number of acidic groups in the radical $R_1$.

9. An organic mercury compound having the general formula $(C_6H_5Hg)_2.R_1$, in which $R_1$ represents a nitro substituted mononuclear dibasic aromatic carboxylic acid radical, which is linked to the $C_6H_5Hg$ groups through the replacement of the acidic hydrogen atoms.

10. An organic mercury compound having the general formula $(C_6H_5Hg)_2.R_1$, in which $R_1$ represents a nitro substituted polynuclear dibasic aromatic carboxylic acid radical, which is linked to the $C_6H_5Hg$ groups through the replacement of the acidic hydrogen atoms.

11. Phenylmercury 3-nitro phthalate.

12. Phenylmercury 3-nitro naphthalate.

CARL N. ANDERSEN.